United States Patent [19]
Kaiser

[11] 3,910,309
[45] Oct. 7, 1975

[54] ROTATABLE COUPLING FOR FLUID AND ELECTRICAL SERVICES

[76] Inventor: Heinz W. Kaiser, Rt. 1, Box 248, Eugene, Oreg. 97404

[22] Filed: Apr. 8, 1974

[21] Appl. No.: 458,597

[52] U.S. Cl. .............................................. 137/580
[51] Int. Cl.² ........................................ F16L 27/08
[58] Field of Search ............ 137/560, 580, 615, 616

[56] References Cited
UNITED STATES PATENTS

| | | | |
|---|---|---|---|
| 2,563,531 | 8/1951 | Kirkman et al. | 137/580 X |
| 3,265,087 | 8/1966 | Livingston | 137/560 |
| 3,381,704 | 5/1968 | Richardson | 137/580 X |
| 3,517,694 | 6/1970 | Lieffring | 137/560 |
| 3,599,378 | 8/1971 | Kachnic | 52/29 |
| 3,636,975 | 1/1972 | Kirkman et al. | 137/580 |
| 3,776,270 | 12/1973 | Wanger | 137/580 |

*Primary Examiner*—Henry T. Klinksiek
*Attorney, Agent, or Firm*—James D. Givnan, Jr.

[57] ABSTRACT

A coupling providing multiple fluid and electrical services to a rotatable building with said coupling being supported coaxially along a waste conduit on the rotational axis of the building structure. Axially aligned waste conduit segments rotatably support coupling components with water supply pipes to the building structure being routed upwardly through a slip ring drum. Stationary brushes are mounted within a coupling housing and ride in contact with the drum slip rings. An annularly recessed collector ring defines water supply chambers which chambers are in ported communication with the above mentioned water supply pipes.

4 Claims, 4 Drawing Figures

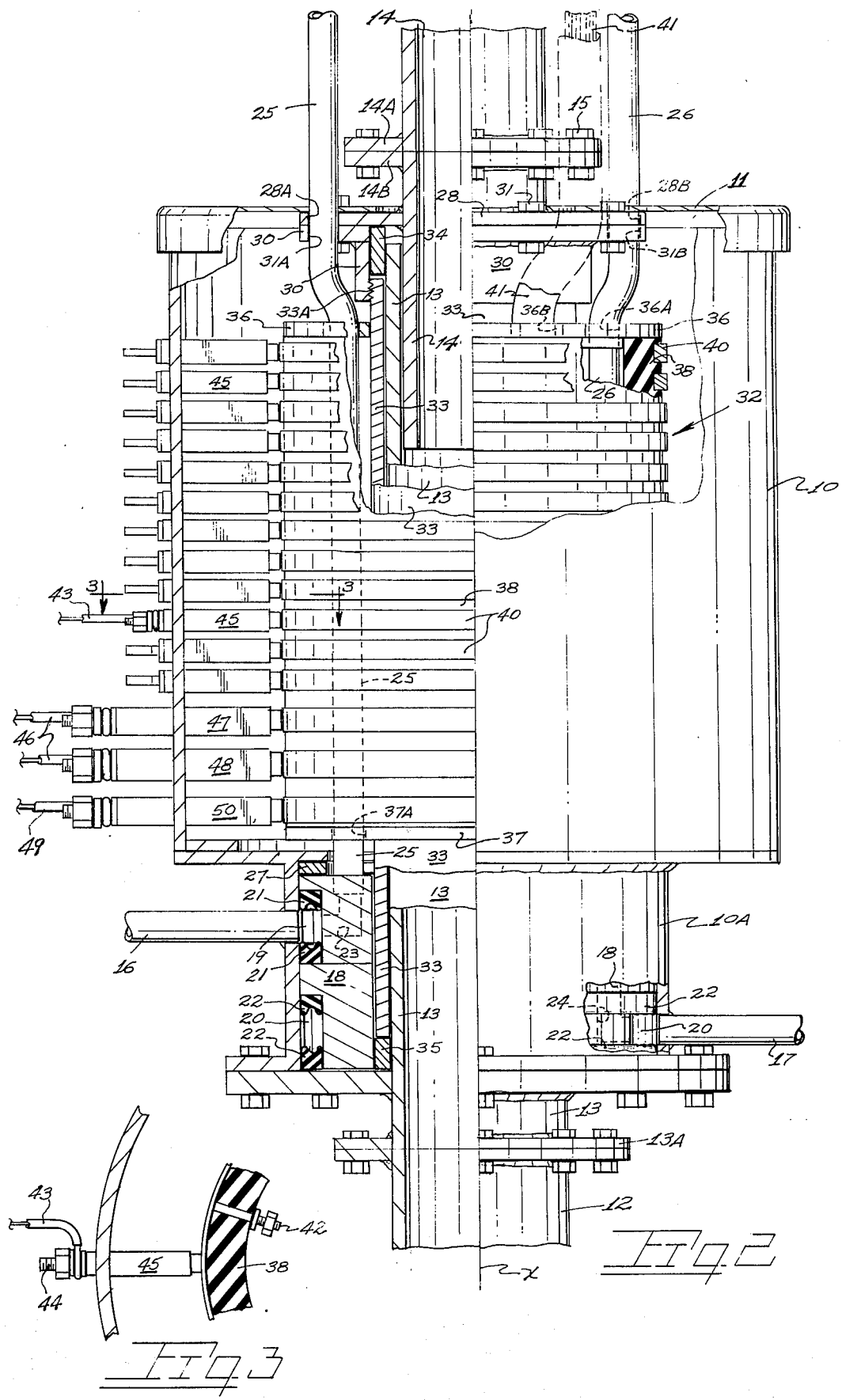

3,910,309

ROTATABLE COUPLING FOR FLUID AND ELECTRICAL SERVICES

BACKGROUND OF THE INVENTION

The present invention concerns a multi-purpose coupling or connector having both stationary and rotatable components which communicate electrical and fluid services to an inhabitable structure such as a home, commercial building or the like. Such services normally include but are not restricted to electricity, hot and cold water supplies, waste removal conduit and communications circuitry.

Rotating structures, generally of circular shape, have been utilized in the past to a limited extent as homes, restaurants, display buildings at fairs, etc.,. Typically such structures include a stationary central portion or core within which are most often located the structures appliances utilizing the foregoing services. Such appliance placement obviates the difficult task of communicating stationary and moving electrical and water conduits. Necessarily, the space available within the stationary core for said appliances is severely restricted. Attempts to overcome the difficult task of communicating moving and stationary conduit components include the provision of flexible lengths of service conduits secured oppositely to stationary and moving fittings with rotational travel of the structure so served being in an oscillating manner. Other attempts include rotatable coupling as for example that disclosed in U.S. Pat. No. 3,599,378 which partially achieves the desired service connections.

SUMMARY OF THE INVENTION

The present multiple services coupling is for coaxial placement along the projected vertical axis of a rotatable building structure. Both stationary and moving components of the coupling are concentrically disposed about said axis. A stationary housing of the coupling mounts electrical brushes in sliding contact with drum mounted slip rings. Also within said housing is an annularly recessed collector ring receiving a water supply within its annular chambers which in turn are in communication with water supply pipes of the coupling. Extending centrally through the coupling is a waste conduit which serves a dual function in that it supports the present coupling along the building axis. Said water supply pipes are routed upwardly adjacent the waste conduit and electrical conduit in an angular path towards the building structure in a compact manner. Sources of electricity and water are provided to the stationary coupling components by conventional conduit arrangements.

Important objectives of the present invention include: the provision of a single compact coupling for placement along the rotational axis of a rotatable building structure for interconnecting all of the fluid and electrical services normally associated with an inhabitable building structure; the provision of a coupling wherein waste conduit members may additionally function as supporting means for the rotatable and stationary coupling components; the provision of a coupling wherein electrical and fluid conduits are adequately protected from one another to avoid electrical failures; the provision of a coupling of a compact nature having easily accessible components for servicing purposes; the provision of a coupling wherein the electrical, water and waste conduits serving the living area rotate therewith permitting unrestricted rotation of said living area as opposed to rotatable structures with tethered conduits; the provision of a coupling wherein fluid is communicated via a rotatable collector ring within which are formed annular chambers; the provision of a coupling which lends itself to convenient installation and removal for servicing purposes.

BRIEF DESCRIPTION OF THE DRAWINGS

In the accompanying drawings:

FIG. 2 is an elevational view of the coupling wherein fragments of the housing and drum have been broken away for illustrative purposes, FIG. 3 is a sectional view of the drum and housing taken approximately along line 3—3 of FIG. 2 showing drum and brush details.

DETAILED DESCRIPTION OF THE PREFERRED EMBODIMENTS

Figure 1:
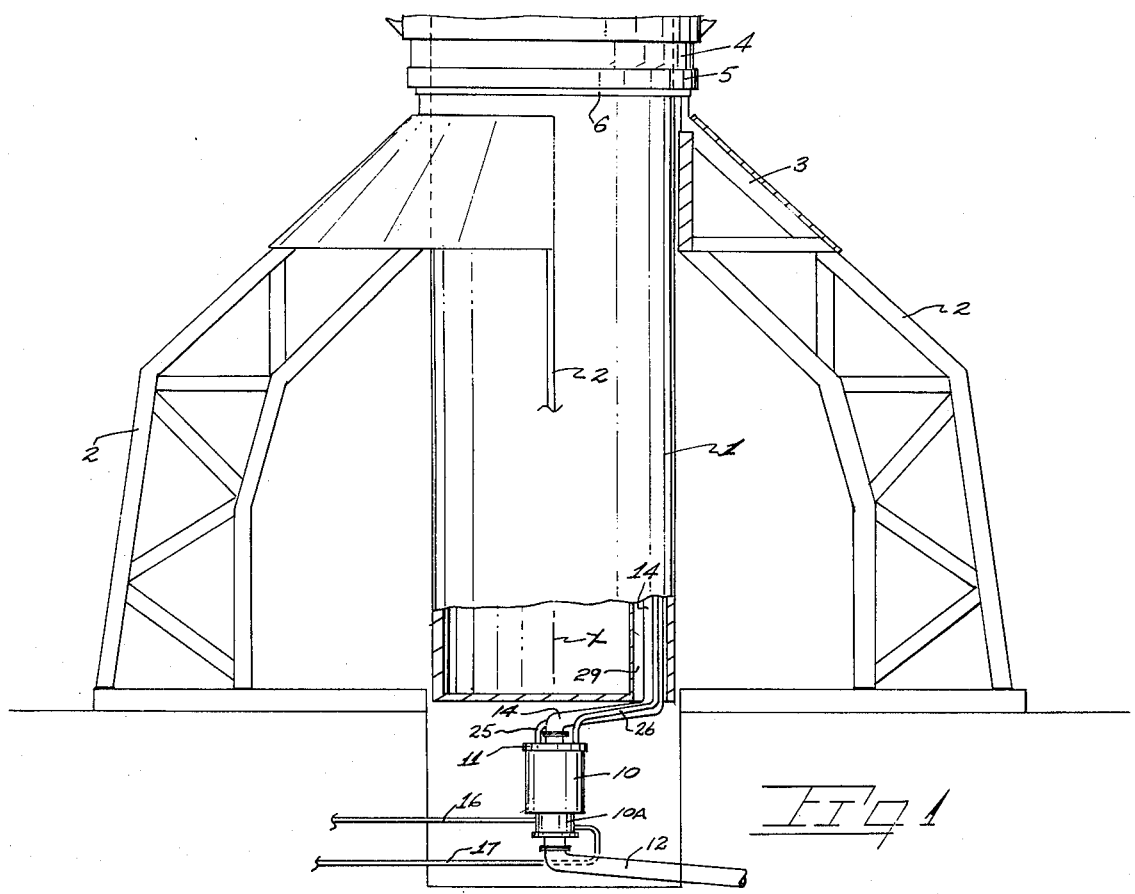
FIG. 1 is an elevational view of a rotatable building support structure within which is rotatably supported the central core of a building served by the present coupling invention which is in axial relationship with said core.

With continuing reference to the accompanying drawings in which applied reference numerals indicate parts similarly identified in the following description, the reference numeral 1 indicates the rotatable cylindrical core of an inhabitable structure such as a home or commercial building which strucutre is the subject of a copending U.S. Pat. No. application. A fabricated steel support for the rotatable building structure includes multiple legs or gantries 2 in support of a rigid collar structure 3. For present purposes it will be sufficient to note that core 1 is part of the rotatable living structure, the upper portion of the core being housed within a radially spaced cylindrical structure 4 which in turn is rotatably supported on an outer bearing race 5 all of which rotate simultaneously. Stationary collar 3 supports a stationary inner bearing race 6. For imparting rotational movement to said core and hence the building structure, a powered pinion is carried by core 1 which is in mesh with a ring gear (not shown) on the stationary inner bearing race. While the present coupling is disclosed and described in association with a rotatable building structure, it is to be understood that other applications of the coupling will be readily apparent to those skilled in the coupling art.

With attention now to the instant invention and with particular reference to FIG. 2, a coupling housing at 10 is of cylindrical shape and includes a reduced portion 10A each respectively housing electrical and water service components. Housing 10 is supported in axial alignment with the vertical rotational axis indicated at X of core 1 (and the building structure) by means of a stationary waste conduit 12. Housing 10 constitutes a weldment of cylindrical sections and is closed at its upper end by an upwardly spaced closure plate 11. A stationary waste conduit segment 13 is in flanged attachment at 13A with conduit 12 and projects axially upward into housing 10. Conduit segment 13 receives at its upper end the lower terminus of a rotatable waste conduit 14 which may be said to be journaled within circumposed stationary waste conduit segment 13. For assembly purposes, conduit 14 is segmented with flanges 14A-14B bolted at 15.

A water supply to the coupling is disclosed by hot and cold water supply conduits 16 and 17 which terminate at cylindrical housing wall 10A. Rotatably housed within said housing wall is a collector ring 18 having a pair of annularly extending chambers 19 and 20 formed therein and receiving an uninterrupted flow of hot and cold water via said supply conduits. Pairs of upper and lower ring seals 21 and 22 within the chambers confine the water for inward and upward flow through bores or ports 23-24 in collector ring 18. The seals are of the expanding type wherein internal pressure urges seal edges into sealing contact with cooperating metal surfaces. A ring 27 retains collector 18 against upward displacement.

In downstream communication with ports 23-24 are upwardly directed hot and cold water pipes 25-26 which are routed through a later described electrical drum and through openings 28A-28B in a flange 28 which is in welded attachment to rotatable waste conduit 14. Similarly, a collar 30 in bolted attachment at 31 with flange 28, has a pair of openings at 31A-31B to admit passage of pipes 25-26. With attention to FIG. 1, the water supply pipes 24-25 extend upwardly in side-by-side relationship with the rotating waste conduit 14 with the conduits being grouped for convenient passage upwardly through a services compartment 29 extending the length of core 1.

For purposes of rotatably mounting an electrical drum component indicated generally at 32, I provide a drum support cylinder 33 in upward threaded engagement at 33A with internally threaded collar 30. Upper and lower bronze bushings are indicated at 34 and 35 and constitute bearings for rotatable components of the coupling.

Figure 4:
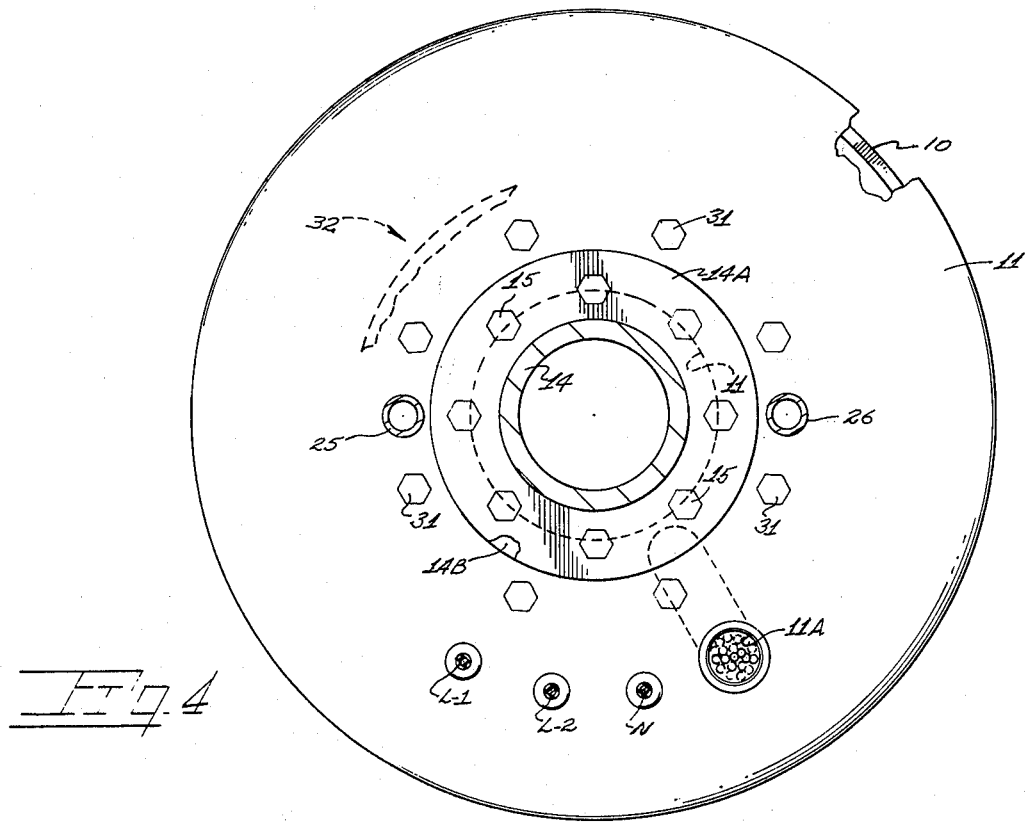
FIG. 4 is a plan view of FIG. 2 showing a cover plate of the coupling.

Suitably secured to drum support cylinder 33 as by a pressed fit or threaded connection are drum end plates 36-37 of slip ring equipped drum 32. Said end plates are diametrically apertured at 36A-37A for the passage of water supply pipes 25-26. Each of said end plates is annularly shouldered to mount the ends of a dielectric drum body 38 having embedded therein a series of spaced, metallic slip rings 40. In circuit with each of said slip rings are electrical leads bundled at 41 and terminating in the drum at binding posts typically shown at 42 (FIG. 3) carried by said drum. Said leads are grouped in a compact manner for routing upwardly through the drum through an end plate opening 36B and thence through an opening 11A (FIG. 4) in closure plate 11. The bundled leads 41 are thence routed upwardly in spaced relationship to rotatable waste conduit 14 and water supply pipes 25-26 by suitable insulative brackets not shown. Binding posts 42 may be mounted in drum body 38 in a helical manner to facilitate wire attachment to the posts.

Serving to provide the stationary housing 10 with multiple electrical sources are conductors as at 43, terminals 44 and brushes 45 and may carry voltages normally associated with communication systems. Conductors as at 46 provide the standard service line voltages of 220 volts to stationary brushes 47-48 each of which also rides in contact with a slip ring 40. A ground conductor 49 terminates at a binding post 50 mounted on housing 10. Electrical leads at L-1; L-2 and N of FIG. 4 originate at drum mounted binding posts to carry the higher voltage currents to the rotatable building structure.

From the foregoing description it will be seen that rotation of central core 1 of the rotatable building structure will impart rotational movement to the lower terminus of waste conduit 14 which is coaxial with the rotational axis X of said building structure. Similarly rotational movement is imparted to the water supply pipes 25-26 which pass through drum 32 and terminate at collector ring 18. Accordingly, said pipes impart rotation to the collector ring as well as to electrical drum 32 while housing 10 remains stationary. The bundled electrical connectors at 41 are supported in a suitable manner adjacent waste conduit 14 for rotation therewith and routing upwardly through services compartment 29 of core 1. The waste conduits 12 and 14, in one embodiment of the invention, are respectively of five inch and four inch inside diameters and of steel, well able to withstand any rotational loads imparted to same. Obviously the interfitted ends of the waste conduits may be provided with friction reducing means.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

1. A multiple purpose coupling a unitary nature interconnecting moving and stationary electrical, water and waste conduit components to provide services to a rotatable building structure, said coupling comprising, axially aligned upper and lower waste conduits having interengaging end segments adapted for rotational movement relative to one another, said upper waste conduit being rotatable with said building structure about a common axis, A stationary housing radially spaced from and supported by said lower waste conduit, a drum concentrically disposed within said housing and depending from said upper waste conduit, electrical conductor means carried by said stationary housing and in circuit with an electrical source, cooperating conductor means carried by said drum and in continuous circuit with said housing conductor means and with electrical leads to the building structure, said housing also in communication with a water source, a water collector ring movably mounted within said housing and defining annular water charged chambers receiving a water supply from the water source, water conduit means in continuous upstream communication with the chambers in said collector ring, said conduit means routed upwardly through said drum along a course intermediate the lower waste conduit and the exterior of said drum, and said electrical leads and water conduit means exiting the upper end of said housing in proximity to the upper waste conduit for rotation therewith in a compact manner and with the building structure to communicate their respective services to said structure.

2. The coupling as claimed in claim 1 wherein the end of the upper rotatable waste conduit is in telescopic journaled engagement with an end segment of the lower waste conduit.

3. The coupling as claimed in claim 2 additionally including a drum support cylinder depending from and rotatable with said upper waste conduit for rotational travel about said remaining waste conduit, said support cylinder additionally serving to carry said water collector ring.

4. The coupling as claimed in claim 3 wherein said axially aligned upper and lower waste conduits each include detachable flanged sections located exteriorly of said housing permitting convenient removal of the coupling for servicing purposes.

* * * * *